Oct. 7, 1958  M. J. WILSON  2,854,680
TROLLEY-SUSPENDED VEHICLE-WASHING MACHINE
Filed Sept. 15, 1954  3 Sheets-Sheet 2
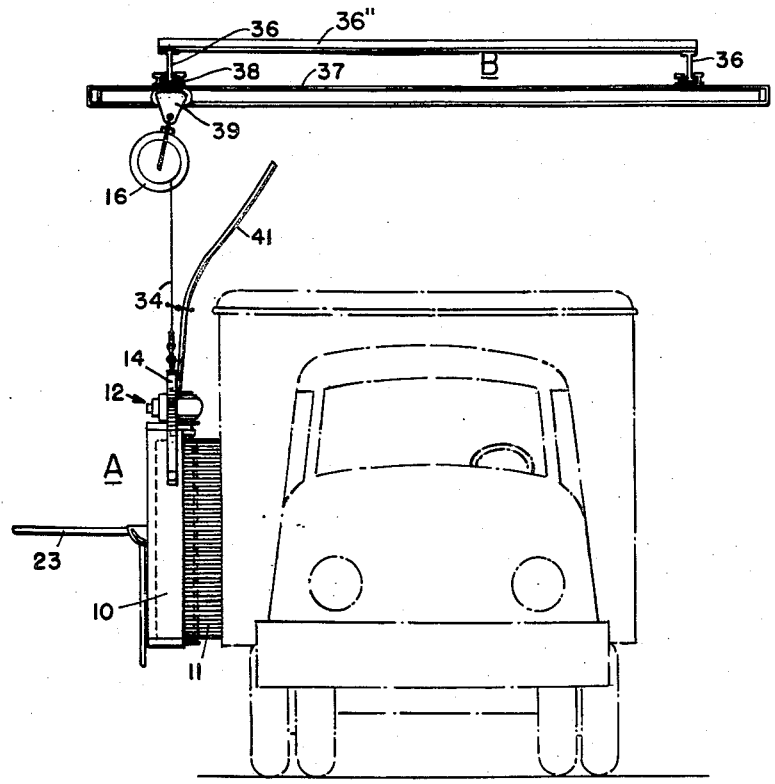
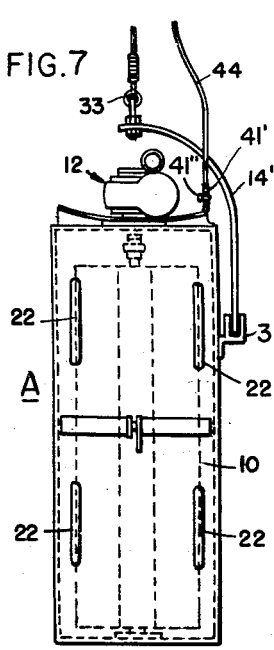
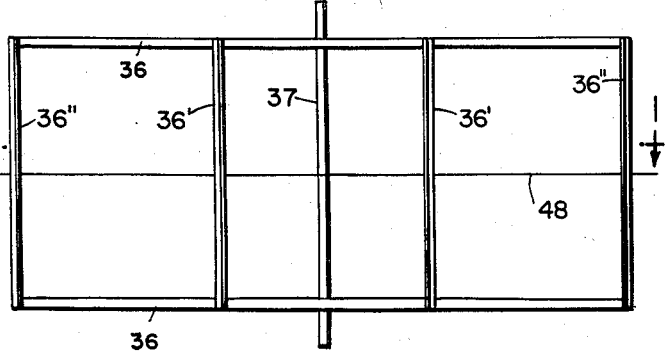
INVENTOR:
MARVIN J. WILSON
BY
ATT'YS Oct. 7, 1958 M. J. WILSON 2,854,680
TROLLEY-SUSPENDED VEHICLE-WASHING MACHINE
Filed Sept. 15, 1954 3 Sheets-Sheet 3
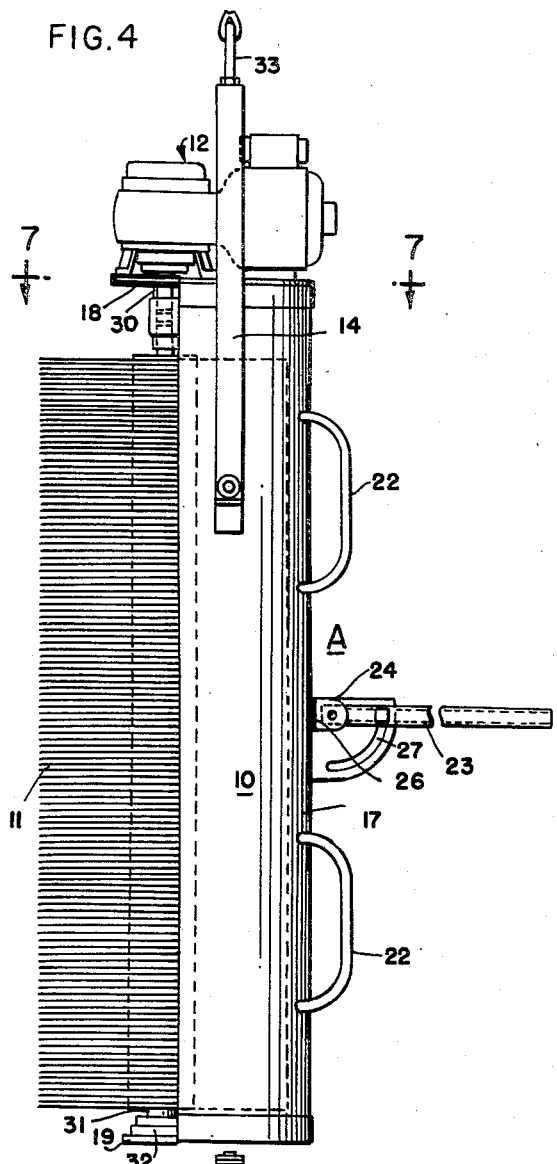
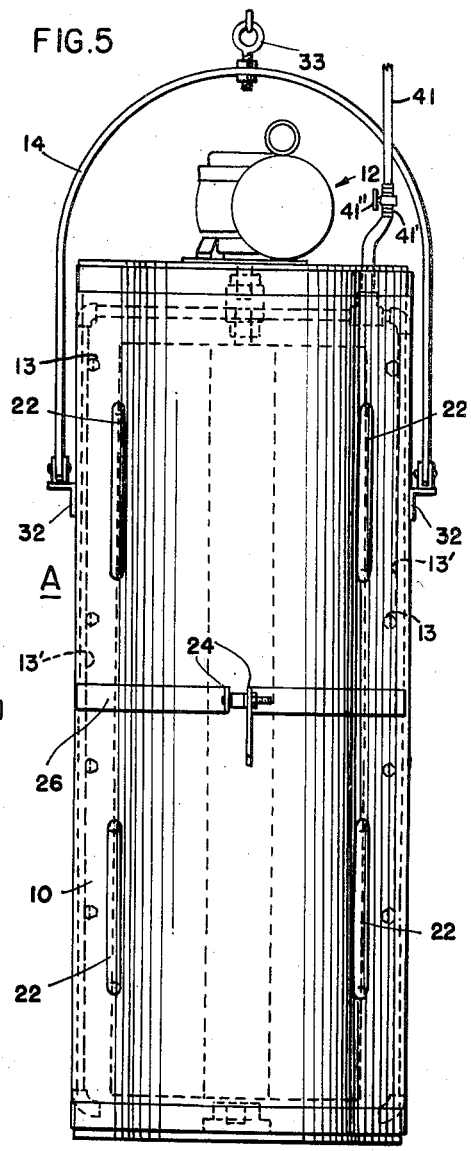
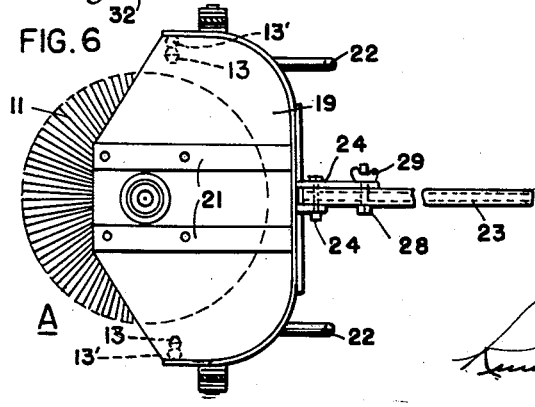
INVENTOR:
MARVIN J. WILSON

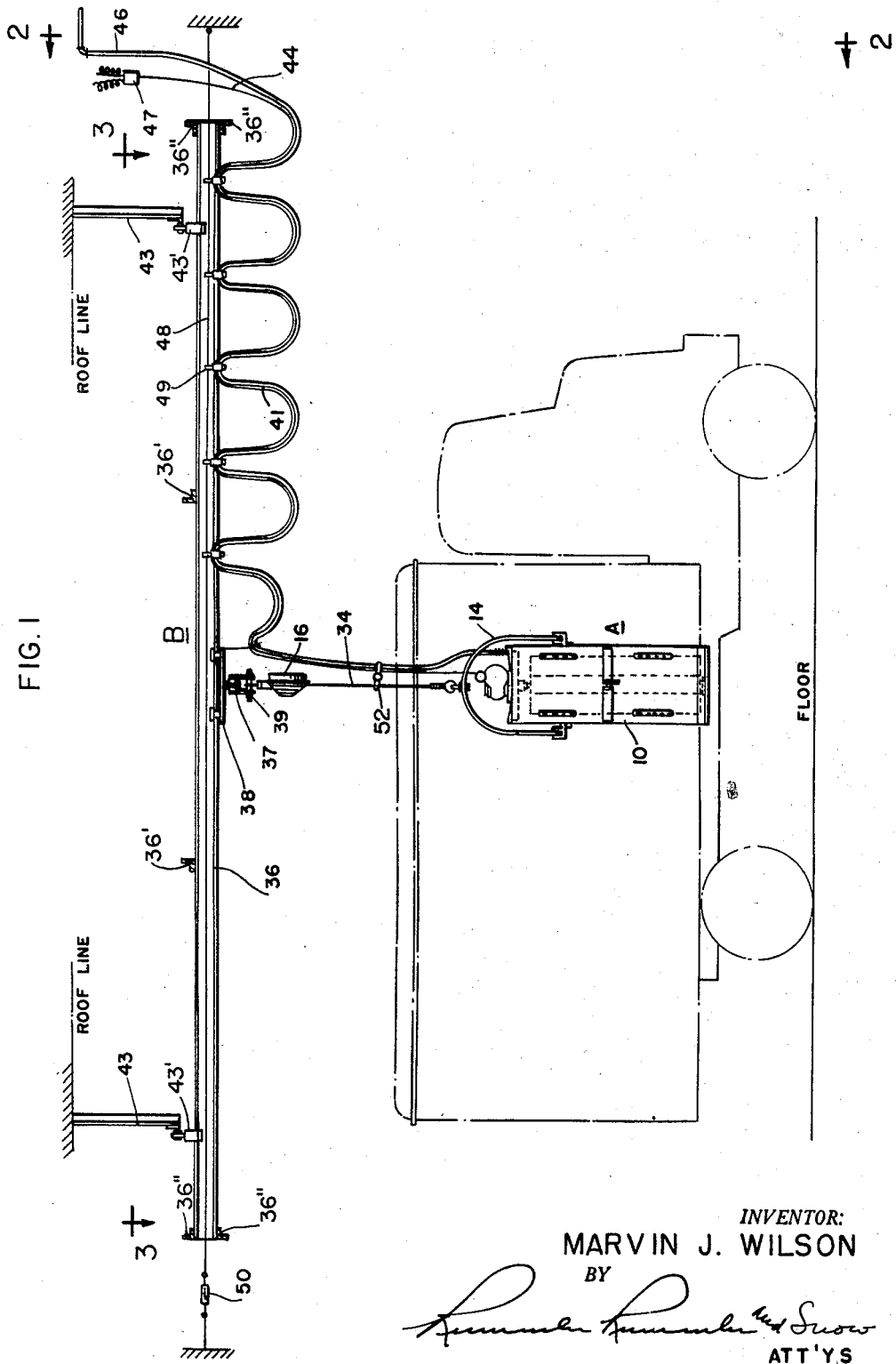

United States Patent Office 2,854,680
Patented Oct. 7, 1958

2,854,680

TROLLEY-SUSPENDED VEHICLE-WASHING MACHINE

Marvin J. Wilson, Chicago, Ill.

Application September 15, 1954, Serial No. 456,145

5 Claims. (Cl. 15—21)

This invention relates to improvements in machines for washing vehicular bodies, and especially for large-size motor-truck vehicles.

The main objects of this invention are to provide an improved form of an overhead-suspended washing unit involving a shielded revolving brush to which, and to the vehicle exterior, a water spray is directed; to provide an improved overhead suspension and travel means for a shield-mounted water-spray-fed brush assembly which permits vertical and horizontal manual maneuverability so as to bring the water-spray-fed brush into the most effective contact with all exterior surfaces of vehicular bodies of varying sizes and contours for facile washing; to provide improved means which permits tilting the shield-brush-spray assembly so as to render easy and certain the effective washing of vehicular bodies of non-vertical sides and ends; to provide an improved overhead transversely moveable suspension means for the shield-brush-spray assembly and its hose and electrical cord leads; to provide an improved form and arrangement of hand grips and operating handle for an assembly of this kind; and to provide an improved overhead-suspended vehicle-washing machine of this kind which is simple in construction and maneuverable with the greatest possible speed and ease.

One specific embodiment is shown in the accompanying drawings; in which,

Figure 1 is a side elevation of an improved vehicle washing machine and overhead traveling suspension constructed in accordance with this invention; the same being shown in position preparatory to washing a motor vehicle truck shown in dotted or phantom outline; the overhead trackage being shown in a section taken on the line 1—1 of Fig. 3; the handle for manipulating the washer unit being shown omitted for clarity.

Fig. 2 is an end elevation of the same as viewed from the right of Fig. 1 indicated by the line 2—2.

Fig. 3 is a reduced and somewhat diagrammatic view taken on the line 3—3 of Fig. 1 of the track and rail arrangement which provide for the opposite horizontal travel of carriages and trolley to allow for the free movement of the washing unit around all exteriors of the vehicle, once it has been positioned for cleaning;

Fig. 4 is an enlarged side elevation of the washing unit;

Fig. 5 is a rear view of the same;

Fig. 6 is a bottom view of the assembly shown in Fig. 5; and

Fig. 7 is a reduced scale view, similar to Fig. 5, but showing the washing unit suspended on a half bail, instead of a full bail.

The essential concept of this invention involves a motor-driven brush so journaled in an openside supporting shield as to expose a substantial portion of the circumference of the brush outwardly of the shield and between spray heads mounted along the opposite edges of the shield for spraying water onto the brush and onto the vehicle, such shield-brush-spray assembly being suspended from a counter-balanced spring-actuated reel attached to a trolley horizontally reciprocable along a rail secured at its ends to carriages oppositely horizontally reciprocable on a pair of spaced transverse tracks, the shield being equipped with hand grips and an adjustable handle for facile maneuvering of the assembly in car-washing operation.

An improved vehicle-washing machine embodying the foregoing concept comprises a washing unit A adjustably suspended from an overhead oppositely reciprocable suspension means B.

The washing unit A comprises a supporting shield 10 mounting a rotating brush 11 connected to a motor-gear-reduction drive 12 with spray heads 13 arranged along the opposite vertical edges of the shield 10, such assembly being swingably supported on a bail 14 suspended from a reel 16 carried by the overhead suspension means B, hereinafter to be described more fully.

The shield 10, most clearly shown in Figs. 4, 5 and 6, has a substantially arcuate-shaped, main, vertical element 17 with bonded top and bottom end panels 18 and 19. These end panels have their middle portions extended outwardly beyond the chord through the vertical opposite edges of the main element 17, as most clearly shown in Fig. 6. Generally reinforcing strips 21 are secured to one face of each of the end panels 18 and 19.

Hand grips 22 and a handle 23 are secured to the main vertical element 17 of the shield 10 to render the washing unit A readily maneuverable up and down and around the vehicle body requiring washing. The hand grips 22 are lengths of rods with their ends bent transverse to an intermediate portion so as to be somewhat arcuate in form. These transverse ends are suitably bonded to the main vertical part 17 of the shield 10. There are four such hand grips shown spaced horizontally and vertically apart at opposite sides of the vertical and transverse medial planes of the element 17.

The handle 23 is a metal bar, one end of which is hinged to lugs 24 formed on the ends of strips 26 bonded transversely along the outer face of the vertical element 17 medially thereof. One lug 24 is enlarged to form a sector with a concentric slot 27 in which moves a bolt 28 on the handle 23. A wing nut 29 on the bolt 28 serves to clamp the handle 23 in selected angular positions relative to the shield 10 so as to facilitate the maneuvering of the unit A for washing operations.

The brush 11 is a standard cylindrical construction with the ends of its shaft 31 set in bearings 30 on the end plates 18 and 19. The brush 11 is of such a diameter that a substantial portion of its circumference is exposed beyond the vertical edges of the shield whereon the spray heads 13 are located.

The motor-reduction gear drive 12 is a standard construction and is mounted on the shield end 18 and suitably connected to the shaft 31 of the brush 11.

The spray heads 13 are spaced apart and mounted on sections of pipe 13' secured along the opposite inner edges of the shield 10. (See Fig. 6.) Each pipe section 13' has two longitudinal series of spray heads 13 secured thereon and spaced circumferentially from each other. One series of spray heads 13 serves to direct a spray of water onto the brush 11 and the other series directs a spray of water onto the surface of the vehicle being cleaned. The pipes 13' are connected together and to the hose service lead 41.

The bail 14, as shown in all the figures except Fig. 7, is a flat metal strap bent to arcuate form with its ends hinged to brackets 32 bonded to the opposite sides of the vertical element 17 of the shield 10, at a point about half way between the top of the shield and the transverse medial plane.

In Fig. 7, the bail 14' is half the complete semi-circular loop shown in the other figures as is more conventional with bails. Such a half bail is hinged at one end to a single bracket 32' bonded to the vertical element of the shield 10.

With either form of bail a swivel eye 33 is secured to the bail axially of the shield brush assembly, for attachment to a cable 34 leading to the reel 16.

The reel 16 also is of a conventional spring-actuated counterbalanced construction. The spring is of such size and so tensioned that it normally suspends the washing unit A in the position shown in Fig. 2. So positioned a slight upward push or downward pull by the operator will permit easy raising or lowering of the unit during washing operations.

The overhead suspension means B comprises a pair of tracks 36 held in spaced alinement by transverse supporting angle irons or bars 36' and 36", a transverse rail 37 mounted on carriages 38 traveling on the tracks 36, a trolley 39 traveling the rail 37 and from which is suspended the reel 16, all in association with the service leads, i. e., a water hose 41 and electric cord 44.

The tracks 36 and the rail 37 both here are shown to be of "I" form. They could be of other shapes, as for example T if otherwise suitable means are provided for their support and for the travel of the carriages 38 and trolley 39.

The tracks 36, where the ceilings are high, would be suspended from the roof truss 43 by a beam clamp 43'; otherwise they could be attached directly to the ceiling.

The rail 37 is transversely disposed of the tracks 36 and is attached at its ends to the carriages 38 mounted for travel on the tracks 36.

The particular form and construction of the carriages 38 and the trolley 39 is in no way critical. The essential requirement is that they provide for easy movement along the tracks 36 and rail 37 respectively.

The carrier for the hose 41 and the cord leads 44, from the water supply 46 and a source of electrical current 47 respectively, comprises a cable or wire 48 and a sliding swivel clamp 49. The hangers 49 may be of the sliding swivel snap type. The wire 48 is disposed medially between the tracks 36 between opposite walls or posts and kept appropriately taut by a turnbuckle 50. The clamps or hangers 49 are secured to the service leads to loop the hose and cord leads 41 and 44 respectively so that they may be stretched out or folded up as a unit as the washing unit A is moved around the vehicle being washed. The two service leads are secured together side by side by any suitable means throughout their looping arrangement so as to move as a single unit. A sliding swivel clamp 52 is provided between the cable 34 and the service leads so as to impart movement to the service leads as the cable 34 moves. A connector 41' is used to connect the hose 41 to the pipes 13' and contains a check valve 41" therein to regulate the flow of water to the pipes 13'.

The use and operation of this improved vehicle washing machine is as follows:

Once the washing unit A has been installed and appropriately connected to the water supply 46 and the electrical outlet 47 and is ready for use, a vehicle is moved into place, as shown in Figs. 1 and 2. The operator sets the handle 23 at a desired angle to the shield 10 and with one hand on that handle and the other gripping one of the grips 22 he is in position to maneuver the washing unit A up and down and along all exterior surfaces of the vehicle.

As the operator pulls the washing unit A up and down, the reel 16 takes in or pays out the cable 34 and permits the brush 11 to be positioned to secure the most effective cleaning of the vehicle. If the vehicle contour is curved or angular, tilting of the unit A on the bail 14 insures an appropriate inclination of the brush 11 to best contact such surfaces.

As the operator pulls the washing unit A along and across the vehicle exteriors, the carriages 38 run along the rails 36 and/or the trolley 39 runs along the rail 37 to accommodate the requirements of the constantly shifting washing unit A.

As the carriers 37 and the trolley 39 thus travel along the tracks 36 and rail 37 respectively, the hangers 49 slide forth and back along the wire 48 to adjust the hose and cord leads 41 and 44 to the requirements of the overall situation.

It is to be understood that numerous details shown may be altered or omitted without departing from the spirit of this kind as defined by the following claims:

I claim:

1. A vehicle washing machine comprising, a brush-support shield approximating arcuate cross-section form and having bearing plates located at opposite ends thereof and extending outwardly of the lateral edges of the shield, a cylindrical-shaped brush journaled on the end-plate bearings on an axis adjacently outward of a plane through the lateral edges of the shield, spray heads disposed along the lateral edges of the shield on the inner face thereof directed to spray liquid toward the brush, a motor drive mounted on one end plate and connected to rotate the brush, an overhead carriage-trolley means movable in opposite directions transverse to and lengthwise of the vehicle positioned for washing, a counter-balanced spring-actuated reel attached to the carriage-trolley means, a cable suspending the shield from the reel with the brush axis vertical, and means on the shield for manual maneuvering the shield-brush assembly in opposite horizontal and vertical directions as permitted by the overhead suspension to maintain the brush in contact with the vertical surfaces of the vehicle to be cleaned.

2. A vehicle washing machine comprising, a brush-support shield approximating arcuate cross-section form and having bearing plates located at opposite ends thereof and extending outwardly of the lateral edges of the shield, a cylindrical-shaped brush journaled on the end-plate bearings on an axis adjacently outward of a plane through the lateral edges of the shield so that more than ninety degrees of the brush periphery extends outwardly of the forward edges of the end plates, spray heads disposed along the lateral edges of the shield on the inner face thereof directed to spray liquid toward the brush, a motor drive mounted on one end plate and connected to rotate the brush, an overhead carriage-trolley means movable in opposite directions transverse to and lengthwise of the vehicle positioned for washing, a counter-balanced spring-actuated reel attached to the carriage-trolley means, a cable suspending the shield from the reel with the brush axis vertical, and means on the shield for manual maneuvering the shield-brush assembly in opposite horizontal and vertical directions as permitted by the overhead suspension to maintain the brush in contact with the vertical surfaces of the vehicle to be cleaned.

3. A vehicle washing machine comprising, a brush-support shield approximating arcuate cross-section form and having bearing plates located at opposite ends thereof and extending outwardly of the lateral edges of the shield, a cylindrical-shaped brush journaled on the end-plate bearings on an axis adjacently outward of a plane through the lateral edges of the shield, spray heads disposed along the lateral edges of the shield on the inner face thereof directed to spray liquid toward the brush, a motor drive mounted on one end plate and connected to rotate the brush, an overhead carriage-trolley means movable in opposite directions transverse to and lengthwise of the vehicle positioned for washing, a counter-balanced spring-actuated reel attached to the carriage-trolley means, a bail hinged to the shield above the transverse medial plane, a cable connected to the bail and suspending the shield from the reel with the brush axis vertical, and means on the shield for manual maneuvering the shield-brush assembly in opposite horizontal and vertical directions as permitted by the overhead suspension to maintain the brush in contact with the vertical surfaces of the vehicle to be cleaned.

4. A vehicle washing machine comprising, a brush-support shield approximating arcuate cross-section form and having bearing plates located at opposite ends thereof and extending outwardly of the lateral edges of the shield, a cylindrical-shaped brush journaled on the end-plate bearings on an axis outwardly of a plane through the lateral edges of the shield, spray heads disposed along the lateral edges of the shield on the inner face thereof directed to spray liquid toward the brush, a motor drive mounted on one end plate and connected to rotate the brush, an overhead carriage-trolley means movable in opposite directions transverse to and lengthwise of the vehicle positioned for washing, a counter-balanced spring-actuated reel attached to the carriage-trolley means, a bail hinged to the shield above the transverse medial plane, a cable connected to the bail and suspending the shield from the reel with the brush axis vertical, and vertically- and transversely-spaced hand grips on the shield for manual maneuvering the shield-brush assembly in opposite horizontal and vertical directions as permitted by the overhead suspension to maintain the brush in contact with the vertical surfaces of the vehicle to be cleaned.

5. A vehicle washing machine comprising, a brush-support shield approximating arcuate cross-section form and having bearing plates located at opposite ends thereof and extending outwardly of the lateral edges of the shield, a cylindrical-shaped brush journaled on the end-plate bearings on an axis adjacently outward of a plane through the lateral edges of the shield, spray heads disposed along the lateral edges of the shield on the inner face thereof directed to spray liquid toward the brush, a motor drive mounted on one end plate and connected to rotate the brush, an overhead carriage-trolley means movable in opposite directions transverse to and lengthwise of the vehicle positioned for washing, a counterbalanced spring-actuated reel attached to the carriage-trolley means, a bail hinged to the shield above the transverse medial plane, a cable connected to the bail and suspending the shield from the reel with the brush axis vertical, vertically- and transversely-spaced hand grips on the shield for manual maneuvering the shield-brush assembly in opposite horizontal and vertical directions as permitted by the overhead suspension to maintain the brush in contact with the vertical surfaces of the vehicle to be cleaned, and a pivotally-adjustable handle secured to the shield adjacent the intersection of vertical and transverse medial planes for coaction with the hand grips for manual maneuvering the shield-brush assembly in opposite horizontal and vertical directions as permitted by the overhead suspension to maintain the brush in contact with the vertical surfaces of the vehicle to be cleaned.

References Cited in the file of this patent

UNITED STATES PATENTS

| 1,273,077 | Lund | July 16, 1918 |
| 1,550,187 | Vara | Aug. 18, 1925 |
| 1,632,705 | Keith | June 14, 1927 |
| 1,697,534 | Macready et al. | Jan. 1, 1929 |
| 2,636,198 | Wilson | Apr. 28, 1953 |
| 2,676,600 | Vani et al. | Apr. 27, 1954 |

FOREIGN PATENTS

| 109,079 | Switzerland | Feb. 16, 1925 |
| 403,170 | France | June 20, 1910 |
| | (First addition to No. 12,375) | |
| 413,366 | Germany | May 7, 1925 |